United States Patent [19]

Becker

[11] Patent Number: 4,959,572
[45] Date of Patent: Sep. 25, 1990

[54] ROTATING RECTIFIER ASSEMBLY

[75] Inventor: Richard J. Becker, Brick, N.J.

[73] Assignee: Allied-Signal Inc., Morris Township, Morris County, N.J.

[21] Appl. No.: 371,362

[22] Filed: Jun. 26, 1989

[51] Int. Cl.⁵ .................. H02K 15/14; B32B 15/08
[52] U.S. Cl. .............................. 310/68 D; 310/71; 310/91
[58] Field of Search ............... 310/68 D, 91, 261, 43, 310/71, 42

[56] References Cited

U.S. PATENT DOCUMENTS 3,829,725 8/1974 Petersen et al. ................ 310/68 D
4,798,769 1/1989 Hayashi et al. .................. 428/460

FOREIGN PATENT DOCUMENTS 1130058 5/1962 Fed. Rep. of Germany ... 310/68 D

Primary Examiner—Steven L. Stephan
Assistant Examiner—D. L. Rebsch
Attorney, Agent, or Firm—Glen M. Diehl

[57] ABSTRACT

Apparatus and method for electrically interconnecting in and supporting the rectifier components a rotating rectifier assembly. An exciter rotor and the rectifier assembly are disposed about a generator shaft. In an embodiment providing full wave rectification, the rectifier assembly has a substrate having rectifiers mounted in a rectifying circuit on two exposed conductive areas. An ac lead extends from each of the ac windings in the exciter rotor to the rotating rectifier assembly. A bus bar has a bar section secured to adjacent rectifiers. The bus bar further has a tab section adapted to receive one ac lead extending from the bar section. A support ring is disposed about the generator shaft and secured to the recifier substrate, as well as the exciter rotor. The tab section from each of the bus bars is wrapped around the inner sleeve of the ring so that the centrifical forces exerted on the bus bars during the rotation of the shaft are opposed by the inner sleeve of the ring.

27 Claims, 3 Drawing Sheets

ROTATING RECTIFIER ASSEMBLY

BACKGROUND OF THE INVENTION

This invention relates to rotating rectifier assemblies. More specifically, this invention relates to apparatus for electrically interconnecting and supporting the components in such assemblies.

Self-excited brushless ac generators typically utilize a rotating rectifier assembly to rectify the output of an exciter rotor and to feed the resulting dc voltage to a main generator rotor. Rectifier diodes enclosed in DO-5 cases have been traditionally used in such rotating rectifier assemblies. Such assemblies were acceptable for use in generators which rotate at relatively low speeds and have space available for the required mounting and electrical interconnections. The present trend in generator design, however, is to reduce the weight and volume of the generators for a given load. A state of the art generator, therefore, must rotate at increased speeds, such as 30,000 RPM, to meet load requirements. The increased rotational speed increases the centrifugal forces exerted on the diodes, thereby decreasing reliability in prior art assemblies. In fact, some prior art rotating rectifier assemblies can fly apart when subjected to the increased centrifugal forces.

Attempts to radially mount the diodes in a rotating rectifier assembly have resulted in unreliable and bulky assemblies. Examples of such attempts include large copper diodes being screwed into a substrate as well as diodes being soldered together along a ring. Such bulky assemblies adapt poorly to the trend of downsizing the generators which must enclose them.

A rotating rectifier assembly which is able to withstand the increased centrifugal forces created in state of the art generators, therefore, is needed.

SUMMARY OF THE INVENTION

The present invention is a rotating rectifier assembly disposed about a rotatable shaft for rotation therewith for rectifying a poly-phase ac signal generated by a plurality of windings in an exciter rotor.

In a preferred embodiment, the rotating rectifier assembly includes a substrate disposed about the shaft having a first and second conductive area thereon and at least a pair of rectifiers per phase of the ac signal arranged in a full wave bridge circuit. The first rectifier is secured to the first conductive areas by its cathode, leaving its anode exposed. The second rectifier is secured to the second conductive layer by its anode, leaving its cathode exposed.

A first section of a conductive bus bar is secured to the exposed terminals of each pair of rectifiers. The bus bar further has a second section extending from the first section to which an ac conductor that supplies one phase of the ac signal is secured.

A support ring is disposed about the shaft and is secured for rotation with the substrate. The second section from each of the bus bars extends through the hole in the ring in which the shaft fits and curls or wraps around the ring. The inner sleeve of the ring, therefore, maintains pressure against the second section during rotation of the shaft opposing resulting centrifugal forces.

Finally, two dc conductors are provided, each secured to one of the conductive layers. The dc signal resulting from the operation of the rectifying circuit is provided across these conductors In an alternate embodiment the rotating rectifier assembly comprises only a half wave rectifying circuit. In this embodiment, the substrate only has a single substrate and only one rectifier per phase of the ac signal is needed. The bus bar is secured to a single rectifier and the support ring and bus bar assembled as before.

DESCRIPTION OF THE PREFERRED EMBODIMENT

Figure 1:
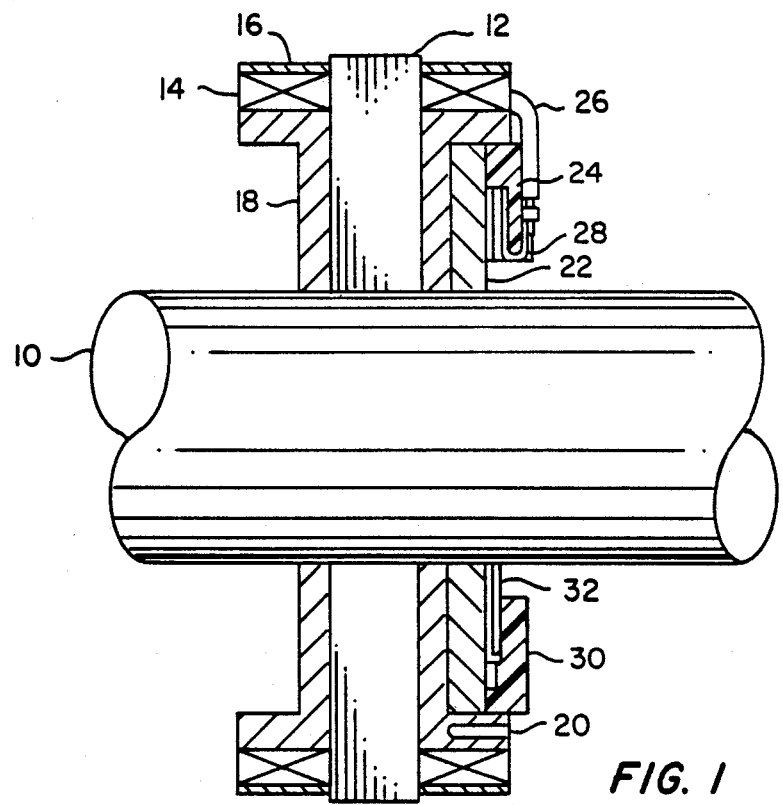
FIG. 1 is a section view of a preferred embodiment of the rotating rectifier assembly of the present invention disposed about a main generator shaft and mounted to an exciter rotor.

FIG. 1 illustrates a section view of a preferred embodiment of a rotating rectifier assembly of the present invention disposed about a main generator shaft 10 and mounted to an exciter rotor so that the rotating rectifier assembly rotates with the shaft 10. The exciter rotor includes a magnetic exciter stack 12, ac windings 14 and a support ring 16 for the ac windings 14. As the exciter rotor and the shaft 10 rotate together, a three-phase electrical current is induced in the ac windings 14 by means of the magnetic exciter stack 12 and stationary field poles and windings (not shown). The induced ac current is rectified by the rotating rectifier assembly of the present invention.

An aluminum heat sink 18 is secured to the exciter rotor and shrunk fit onto the main generator shaft 10 to provide a heat transfer path through which heat is transferred from the windings 14 and the magnetic core 12 to the generator shaft 10 in an oil conduction cooled machine. Further, a balancing ring 20 is provided within the exciter rotor, which provides the same function as the aluminum heat sink 18, in addition to balancing the entire assembly.

The section view of FIG. 1 of the rotating rectifier assembly of the present invention illustrates a substrate 22, a rectifier 24, an ac lead 26, a bus bar 28, a ring 30 and a dc lead 32. The number of rectifiers 24 is dependent on the number of phases in the ac signal to be rectified and the required power levels. In the preferred embodiment wherein full wave rectification is performed, there is at least a pair of rectifiers per phase of the ac signal, with a greater number provided in cases where the power levels to be dissipated by a rectifier 24 exceeds the rating of the rectifier 24. There is one ac lead 26 per phase of the ac signal to be rectified and there are two dc leads 32.

The substrate 22 is disposed about the shaft 10 for rotation therewith. Preferably, a substrate 22 is secured to the exciter rotor by means of a shrink fit to the shaft 10, thereby providing a transfer path from the rectifier 24 to the shaft 10 for the heat generated by the rectifier circuit. Each rectifier 24 is secured to the substrate. A bus bar 28 has a first section connected to each pair of rectifiers and a second section extending from the first section which is secured to one of the ac leads 26. The support ring 30 is secured for rotation with the substrate 22 and the exciter rotor. The second section 26 of the bus bar 28 curls or wraps around the ring 30, so that when the shaft 10 in the rotating rectifier assembly rotate, the centrifugal forces exerted on the bus bar 28 are opposed by the force the ring 30 exerts on the bus bar 28. This arrangement, therefore, provides a rotating rectifier assembly having stability and reliability even at high rotational speeds.

Figure 2:
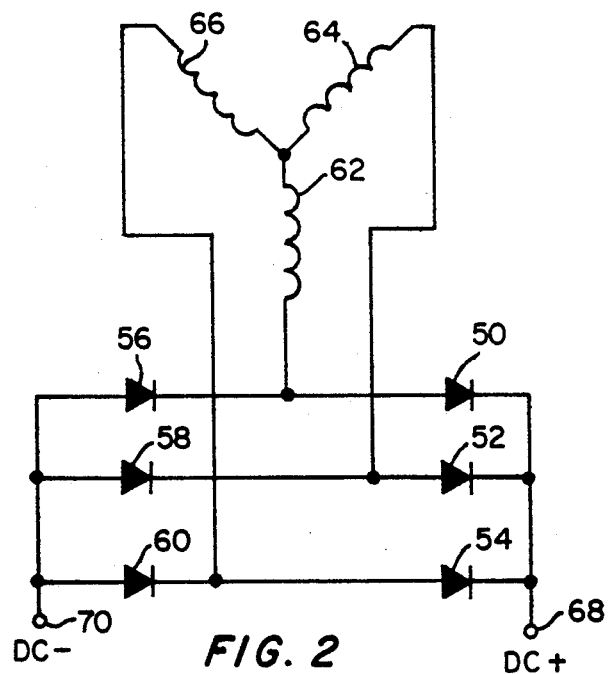
FIG. 2 is an electrical schematic of a three-phase rectifier circuit.

The rotating rectifier assembly is most commonly used to full wave rectify a three phase ac signal. FIG. 2 illustrates the electrical schematic of a typical three-phase rectifying circuit which can be used by the rotating rectifier assembly of the present invention. Six rectifiers 50, 52, 54, 56, 58 and 60 are provided in a standard three phase, full-rectifier circuit. Each phase of the ac signal is received from a respective winding 62, 64 and 66. These windings 62, 64 and 66, correspond to the ac winding 14 illustrated in FIG. 1. The dc output from the circuit of FIG. 2 is provided at terminals 68 and 70.

Figure 3:
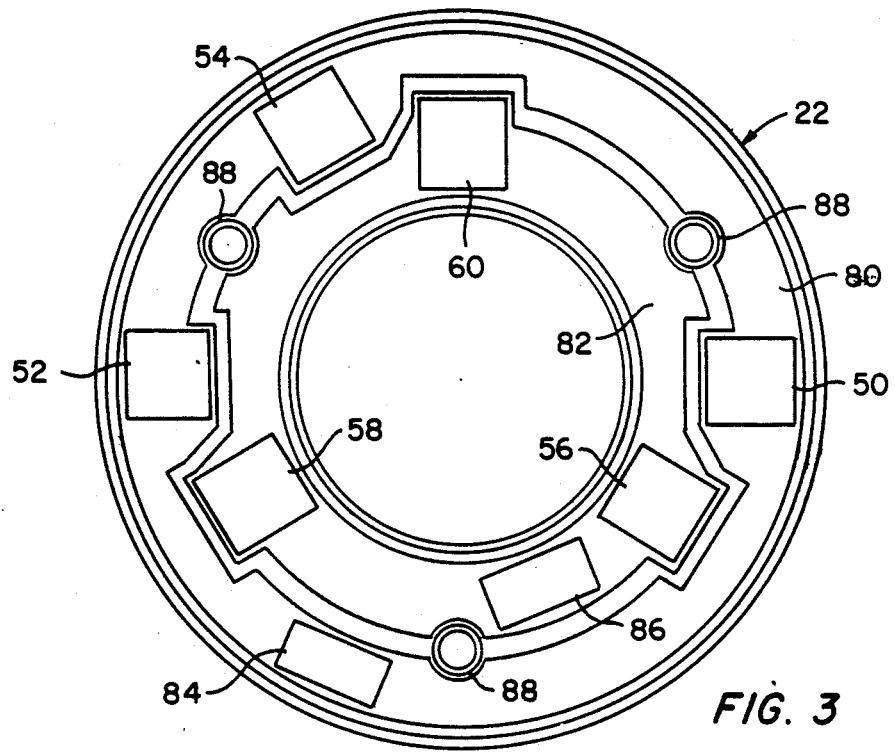
FIG. 3 illustrates the rectifier layout on a substrate in accordance with a preferred embodiment of the present invention.

FIG. 3 illustrates the rectifier layout on the substrate 22 in accordance with a preferred embodiment of the present invention. Two conductive areas 80 and 82 are provided on the rectifier substrate 22. The cathodes of rectifiers 50, 52 and 54 are secured to the first conductive area 80 by a one step soldering process, as follows. The rectifiers are located in a solder fixture having leaf spring type clips which apply pressure to each rectifier during assembly. The rectifiers are assembled in a hydrogen atmosphere at 310° C. The assembled rectifiers are then soldered to the respective conductive area at 266° C. in an oxygen free environment to insure the integrity of the rectifier solder and to prevent oxidation. The bus bars are soldered at the same time using the same type clips to keep the whole assembly in compression. The dc connection pads 84 and 86 are also soldered to their respective conductive area at the same time in the same fashion. The entire oPeration is performed on a temperature controlled hot plate using solder preforms.

The interconnections at terminal 68 between the cathodes of rectifiers 50, 52 and 54 are, therefore, provided by the first conductive area 80 on the substrate 22. The anodes of the rectifiers 56, 58 and 60 are similarly secured to the second conductive area 82. The interconnections at terminal 70 between the anodes of rectifiers 56, 58 and 60 are, therefore, provided by the second conductive area 82 on the substrate 22.

A dc lead, such as lead 32 illustrated in FIG. 1, is secured to each pad 84 and 86. The dc signal resulting from the operation of the rotating rectifier assembly is provided across these dc leads. Mounting holes 88 are provided so that the substrate 22 can be secured to the exciter rotor.

Referring to the schematic in FIG. 2, the interconnection between the exposed anode of the rectifier 50, the exposed cathode of rectifier 56 and the winding 62 is made with a conductive bus bar 28. Similarly, the interconnection between the exposed anode of the rectifier 52, the exposed cathode of the rectifier 58 and the winding 64 and the interconnection between the exposed anode of the rectifier 54, the exposed cathode of the rectifier 60 and the winding 66 are made with bus bars 28.

Figure 4:
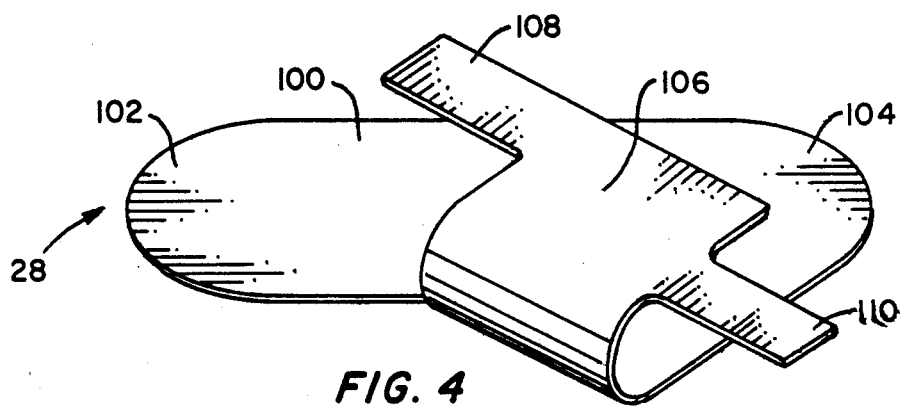
FIG. 4 illustrates a bus bar in accordance with a preferred embodiment of the present invention.

FIG. 4 illustrates a bus bar 28 in accordance with a preferred embodiment of the present invention having a first section 100 with a first end 102 and a second end 104. Further, the bus bar 28 has a second section 106 extending from the first section 100. Fingers 108 and 110 extend outward from the second section 106. These fingers 108 and 110 are folded over to crimp the ac leads 26 from the ac windings 14 to the bus bar 28, thereby providing the ac signals as inputs to the rotating rectifier assembly.

Figure 5:
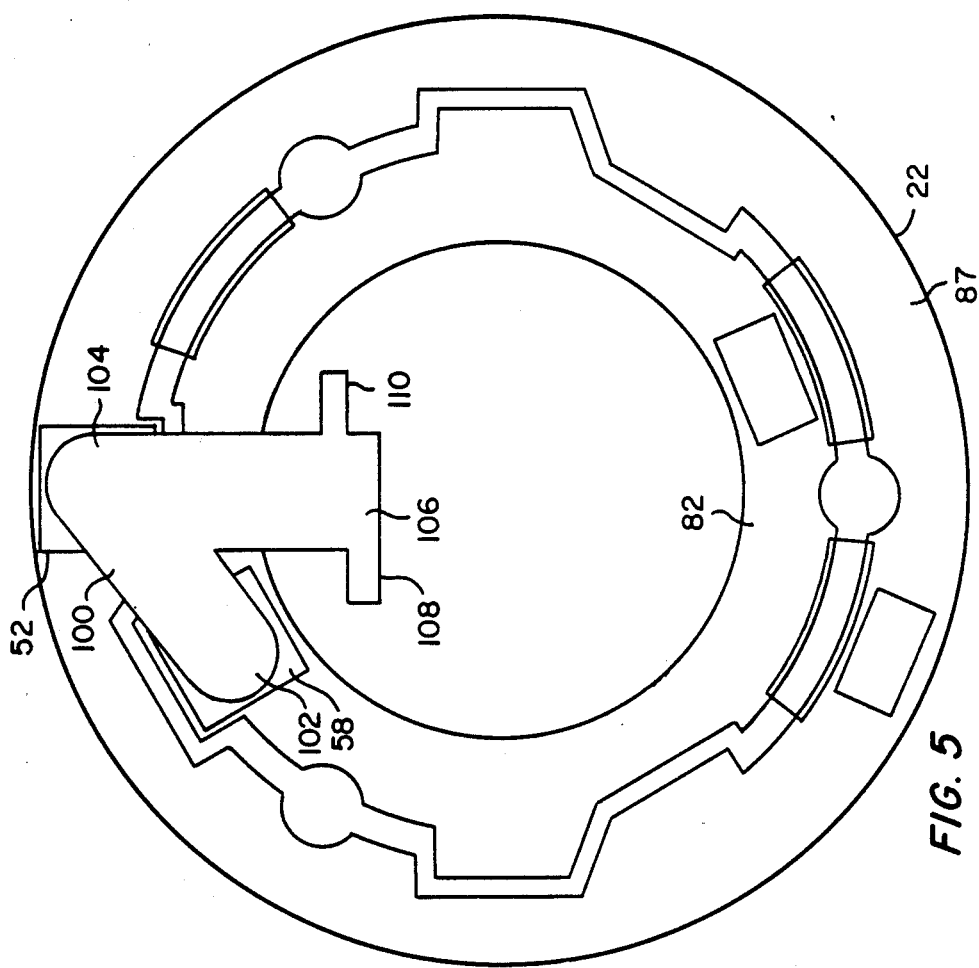
FIG. 5 illustrates the bus bar assembled to two adjacent rectifiers in the rotating rectifier assembly; and, FIGS. 6 and 7 illustrate a support ring in accordance with a preferred embodiment of the present invention.

FIG. 5 illustrates a bus bar 28 mounted to two rectifiers 52 and 58 before it is curled around the support ring 30. The first end 102 of the first section 100 is soldered to the exposed cathode of the rectifier 58. The second end 104 of the first section 100 is soldered to the exposed anode of the rectifier 52 as previously described.

Once the bus bars 28 have been soldered to the remaining pairs of rectifiers 50, 56, 54 and 60 the rotating rectifier assembly is disposed about the main generator shaft 10. The bus bar 28 must be fabricated with a conductive material. It is preferable to use soft pliable metal, such as copper. This allows the second section 106 to bend to a position along the axis of the shaft 10 during assembly. It is further preferred that the copper be electroless nickel plated to prevent solder migration.

Figure 6:
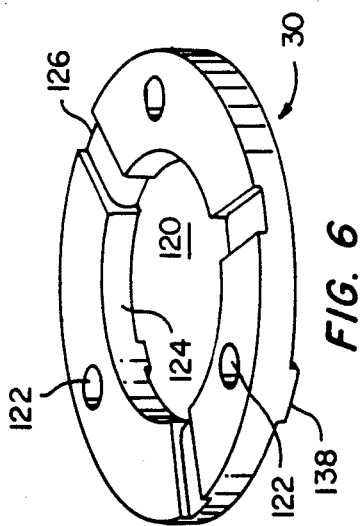
Figure 7:
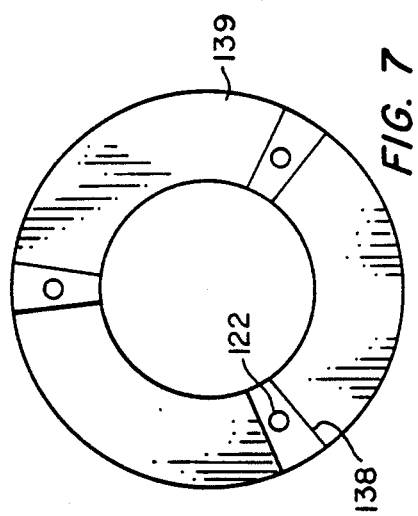

FIGS. 6 and 7 illustrate a support ring 30 which is disposed about the shaft 10 such that the second section 106 passes through the hole 120 through which the shaft 10 fits. The support ring 30 has mounting holes 122 which mate with the mounting holes 88 provided in the substrate 22. A fastening device, Preferably a screw, is used to secure the ring 30 and the substrate 22 to the exciter rotor.

When the supporting ring 30 is assembled onto the substrate 22 and the exciter rotor, the second section 106 of the bus bar 28 is curled or wrapped around the ring 30. The second section 106 preferably contacts an inner sleeve 124 of the ring 30 so that when the assembly rotates the centrifugal forces exerted on the bus bar 28, particularly on the second section 106, will be opposed by the inner sleeve 124 of the support ring 30.

In a preferred embodiment, the ring 30 has a channel 126 adapted for receipt of the bus bar 28. The channel 126 extends through a section of the inner sleeve 124 and through a section of the face 127 which faces away from the substrate 22. The second section 106 from each of the bus bars 28 fits into this channel 126 and conforms to its shape during rotation. The channel 126 provides additional support for the second section 106 against the forces exerted during rotation of the assembly. The ac lead 26 is inserted within the fingers 128 on the second section 126 of the bus bar 28. The fingers 108 and 110 are then crimped about the ac lead 26 to secure the lead to the bus bar 28. The bus bar 28 is then further secured into the channel 126 by epoxy.

The ring is preferably fabricated from a composite PEEK resin epoxy which has been injection molded. The inner diameter of the ring 30 can be further strengthened and reinforced by high strength composite fibers.

FIG. 7 illustrates the face of the support ring 30 adjacent the rectifier substrate 22. In one embodiment, preferred at lower speeds, the area 138 underneath the mounting holes 122 is built up so that the face 139 clears all of the components on the rectifier substrate 22. This embodiment permits air to reach the rectifiers.

In another embodiment, preferred at high speeds, the area 138 is built up only slightly such that a surface 139 on the ring 30 is in contact with the bus bar 28 to keep the rectifiers and the bus bar 28 in compression.

Although an illustrative embodiment of the Present invention has been shown and described, it is understood that various substitutions and modifications can be made by those skilled in the art without departing from the novel spirit and scope of the present invention. By way of example only, the bus bar 28 may assume a number of shapes other than that illustrated in FIG. 4. As another example, the ac signal to be rectified can be single phase or polyphase.

As another example, the rotating rectifier can be used to half wave rectify an ac signal. In this case, only one rectifier per phase of the ac signal need be provided and the substrate need only have a single exposed conductive area. The bus bars are secured to a single rectifier and the support ring positioned over the bus bars as previously described.

As a further example, in cases where the power to be generated exceeds the rating of a rectifier component to be used, additional rectifiers can be added. In this case, the interconnection between the rectifiers and the ac signal is again made with the bus bars, so that the bus bar must be configured to be secured with all the rectifiers related to the phase of the ac signal being rectified.

I claim:

1. A rotating rectifier assembly in a generator for rectifying an ac signal generated by windings in an exciter rotor disposed about a rotatable shaft for rotation therewith, comprising:
   a substrate disposed about the shaft for rotation therewith;
   rectifying means secured to said substrate for rectifying the ac signal;
   ac conductor means having a first end connected to the windings and a second end for supplying the ac signal to the rectifying means;
   a conductive bus bar secured to said second end of said ac conductor means and to said rectifying means;
   a ring disposed about the shaft and secured to said substrate such that said bus bar curls around said ring, whereby said ring opposes centrifugal forces exerted on said bus bar during rotation of the shaft; and
   conductor means secured to substrate on which a dc signal is provided upon rotation of the shaft and the rotating rectifier assembly.

2. A rotating rectifier assembly as claimed in claim 1, wherein said rectifying means is a full wave rectifier circuit having at least two rectifiers and said bus bar is secured to said rectifiers to as to interconnect said rectifiers and the ac signal.

3. A rotating rectifier assembly as claimed in claim 2, wherein the ac signal is polyphase and said rectifying means is a full wave polyphase rectifier circuit having at least two rectifiers per phase of the ac signal and further comprising a bus bar per phase of the ac signal which interconnects said rectifiers and the ac signal.

4. A rotating rectifier assembly as claimed in claim 1, wherein the ac signal is polyphase and said rectifier means is a half wave rectifier circuit having a rectifier per phase of the ac signal and further comprising a bus bars per phase of the ac signal which interconnects said rectifiers and the ac signal.

5. The rotating rectifier assembly as claimed in claim 1, wherein said bus bar is fabricated with a pliable metal so that said bus bar conforms to the shape of said ring during rotation of the generator.

6. The rotating rectifier assembly as claimed in claim 1, wherein said ring has a channel adapted for receipt of said bus bar.

7. The rotating rectifier assembly as claimed in claim 6, wherein said channel extends through an inner sleeve and a face in said ring.

8. The rotating rectifier assembly as claimed in claim 6, wherein said bus bar is fabricated with a Pliable metal so that said bus bar conforms to the shape of said channel during rotation of the generator.

9. The rotating rectifier assembly as claimed in claim 8, wherein said metal is electroless nickel plated copper.

10. The rotating rectifier assembly as claimed in claim 1, wherein said bus bar includes clamping means for securing said second end of said ac conductors.

11. The rotating rectifier assembly as claimed in claim 10, wherein said clamping means are outwardly extending fingers which are crimped onto said second end of said ac conductor.

12. The rotating rectifier assembly as claimed in claim 1, wherein said ring is fabricated from PEEK epoxy resin and reinforced by composite fibers.

13. A rotating rectifier assembly in a generator for rectifying a poly-phase ac signal generated by a plurality of windings in an exciter rotor disposed about a rotatable shaft for rotation therewith, comprising:
   a substrate disposed about the shaft for rotation therewith, said substrate having a first and second conductive area;
   a first and second rectifier for each phase of the ac signal, said first rectifier having a cathode secured to said first conductive area, leaving an anode exposed, said second rectifier having an anode secured to said second conductive area, leaving a cathode exposed;
   an ac conductor for each phase of the ac signal, each having a first end connected to one of the windings and a second end;
   a conductive bus bar for each first and second rectifier, each of said bus bars having a first section secured to said anode of said first rectifier and to said cathode of said second rectifier, each of said bus bars further having a second section extending from said first section to which said second end of one of said ac conductors is secured;
   a ring disposed about the shaft and secured to said substrate such that said second section from each of said bus bars curls around said ring, whereby said ring opposes centrifugal forces exerted on said bus bar during rotation of the shaft; and
   two dc conductors, each connected to one of said conductive areas, across which a dc signal is provided upon rotation of the shaft and the rotating rectifier assembly.

14. The rotating rectifier assembly as claimed in claim 13, wherein said first and second rectifier for each phase of the ac signal are adjacent each other.

15. The rotating rectifier assembly as claimed in claim 13, wherein a face of said ring adjacent said substrate contacts each of said bus bars to keep said bus bars and said rectifiers in compression against said substrate.

16. The rotating rectifier assembly as claimed in claim 13, wherein a face of said ring adjacent said substrate has a recessed area adjacent each of said rectifiers to provide a clearance between said ring and each of said bus bars.

17. The rotating rectifier assembly as claimed in claim 13, wherein each of said bus bars is fabricated with a pliable metal so that each of said bus bars conform to the shape of said ring during rotation of the generator.

18. The rotating rectifier assembly as claimed in claim 13, wherein said ring has a channel adapted for receipt of said second section.

19. The rotating rectifier assembly as claimed in claim 18, wherein said channel extends along an inner sleeve and a face in said ring.

20. The rotating rectifier assembly as claimed in claim 18, wherein each of said bus bars are fabricated with a pliable metal so that each of said bus bars conform to the shape of said channel during rotation of the generator.

21. The rotating rectifier assembly as claimed in claim 20, wherein said metal is electroless nickel plated copper.

22. The rotating rectifier assembly as claimed in claim 13, wherein said tab section on each of said bus bars includes clamping means for securing said second end of one of said ac conductors.

23. The rotating rectifier assembly as claimed in claim 22, wherein said clamping means are outwardly extending fingers crimped onto said second end of said ac conductor.

24. The rotating rectifier assembly as claimed in claim 13, wherein said ring is fabricated from peek epoxy resin and reinforced by composite fibers.

25. The rotating rectifier assembly as claimed in claim 13, wherein each of said bus bars are soldered to said adjacent rectifiers.

26. The rotating rectifier assembly as claimed in claim 13, wherein said substrate is secured to the rotor.

27. The rotating rectifier assembly as claimed in claim 13, wherein said substrate is heat shrunk to the shaft.

* * * * *